United States Patent [19]

Singh

[11] Patent Number: 4,725,212
[45] Date of Patent: Feb. 16, 1988

[54] TIRE CURING PRESS AND LOADER

[75] Inventor: Anand P. Singh, Youngstown, Ohio

[73] Assignee: NRM Corporation, Columbiana, Ohio

[21] Appl. No.: 892,448

[22] Filed: Aug. 4, 1986

[51] Int. Cl.⁴ .......................... B29C 35/00; B30B 15/30
[52] U.S. Cl. .......................................... 425/38; 425/32
[58] Field of Search .................... 294/67 R, 86.24, 88, 294/93–97; 264/299, 304, 315, 326; 425/23, 28 R, 31, 32, 33, 35, 36, 38, 40, 42, 43, 44, 46, 47, 48, 50, 51, 52, 53, 54, 56, 58, DIG. 47

[56] References Cited

U.S. PATENT DOCUMENTS

| | | | |
|---|---|---|---|
| 2,978,741 | 4/1961 | Soderquist | 425/36 |
| 3,065,499 | 11/1962 | Brundage et al. | 425/38 |
| 3,065,503 | 11/1962 | Mallory et al. | 425/38 |
| 3,550,196 | 12/1970 | Gazuit | 425/38 |
| 4,332,536 | 6/1982 | Singh et al. | 425/33 |
| 4,338,069 | 7/1982 | Singh et al. | 425/36 |
| 4,452,576 | 6/1984 | Sheerer et al. | 425/38 |

Primary Examiner—Jay H. Woo
Assistant Examiner—J. Fortenberry
Attorney, Agent, or Firm—Renner, Otto, Boisselle & Lyon

[57] ABSTRACT

A tire press of the slideback type has mounted on the press head beam a precision loader for the uncured tires. The beam moves vertically and then laterally or horizontally while maintaining the top mold section in parallelism with the bottom mold section for concurrent opening, loading of the uncured tire and discharge of the cured tire from the press. The invention includes a pair of tire chucks mounted on a loader beam for precise vertical movement through an electric motor driven rack and pinion drive. The loader beam is in turn mounted on the press head beam but through a lost motion connection. In this manner the loader is uncoupled from the press head during the final loading horizontal travel thereof to allow independent movement of the loader and press head. The loader is biased toward the press head by springs. When the press opens the loader moves with the press head but is stopped short of the full open position of the press head and is engaged by external alignment blocks which then move the loader relative to the press head against the spring pressure during the final portion of movement of the press head to locate the loader precisely independently of any inconsistent full "open" position of the press or press beam. The loader beam is guided in to final loading position independently of the press beam in both a lateral and fore and aft direction. The loader beam thus floats in a horizontal plane in both an X and Y direction.

42 Claims, 5 Drawing Figures

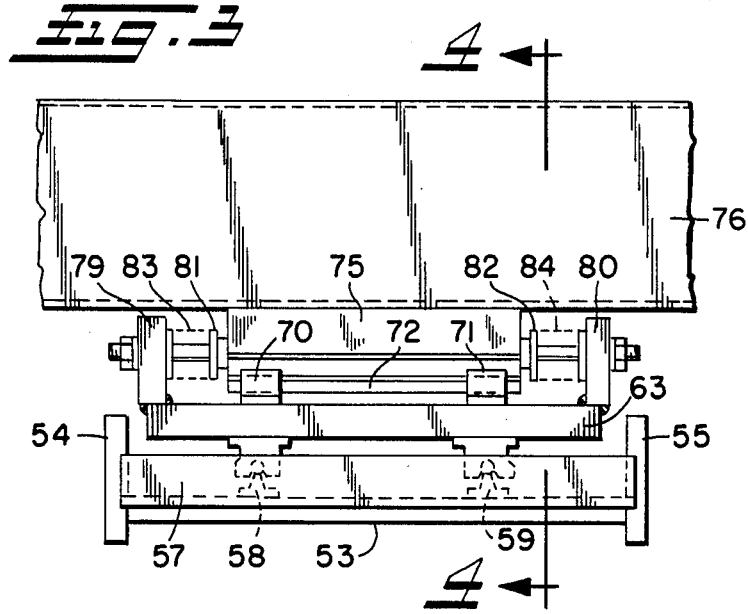
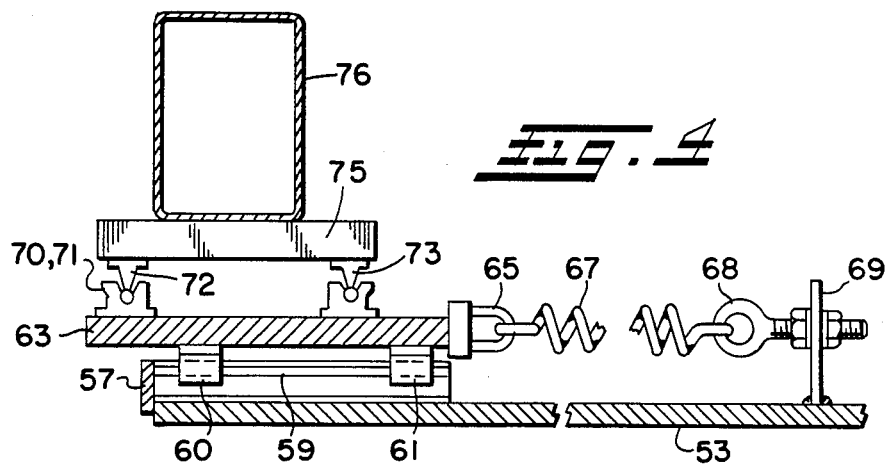
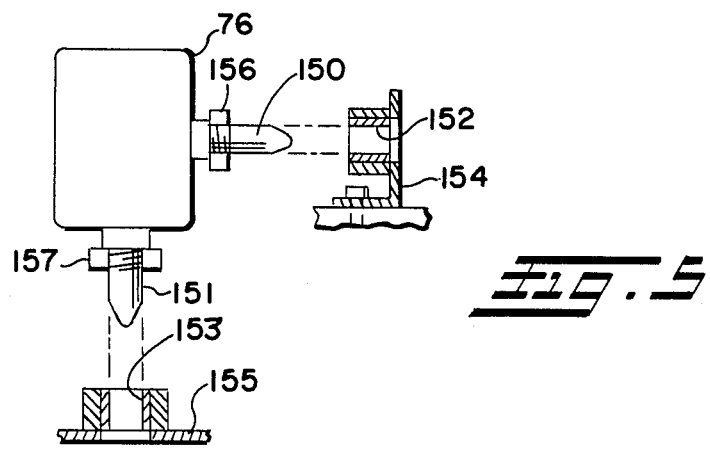

TIRE CURING PRESS AND LOADER

This invention relates generally as indicated to a tire curing press and loader and more particularly to a slideback press and precision loader combination utilizing the advantages of both.

BACKGROUND OF THE INVENTION

A well known and widely used type of tire press is known as a slideback press. In a slideback press the top mold sections are supported on a beam in turn supported by links from bull gears at each side of the press. As the press opens, the beam moves through slots in side plates and back along the top of such plates with a cam follower riding in a slot in such plates maintaining the top mold sections parallel to the fixed bottom mold sections throughout the opening movement. The top mold sections initially move vertically and then horizontally both to clear the bottom mold sections for concurrent loading and removal of the cured tire from the press.

Loaders for such presses have conventionally been mounted on the press beam at each end and normally include an elevator which simply moves the chucks for the uncured tires up and down. In this manner when the press is closed the chucks may descend and pick up incured tires from loader stands in front of the press and hold such tires in elevated position. Two new uncured tires may then be placed in front of the press. When the press then opens, the tires held by the loader are moved with the beam to be positioned over the bottom mold section when the press is fully opened. The loader then descends placing the uncured tires on or near the bottom mold section to be engaged by the shaping and curing bladder. When the tire is properly secured to the bladder the loader releases the tire, elevates, and the press closes. Such tire presses have been sold in large number throughout the world under the trademark AUTOFORM by NRM Corporation of Columbiana, Ohio, U.S.A. Such presses and loaders therefor are also illustrated in a number of U.S. patents, examples being: U.S. Pat. No. 3,065,499 to Brundage et al; U.S. Pat. No. 3,065,503 to Mallory et al; U.S. Pat. No. 3,097,394 to Mallory et al; and U.S. Pat. No. 4,092,090 to Yuhas et al.

Because of tolerances, wear, and controls relating to the size and type of machinery involved the full open position of the press in both an X and Y horizontal direction may vary from cycle to cycle and as the parts of the press wear. If the loader is mounted on the press head, then its final loading position may also vary slightly, resulting in less than desired accuracy in loading.

Because of the need for loading accuracy, applicant has developed a high accuracy loader for a tire press utilizing preloaded linear bearings and driven for vertical movement through a motor driven rack and pinion drive. Reference may be had to applicant's copending application filed Dec. 4, 1985, Ser. No. 804,460, now U.S. Pat. No. 4,618,320, entitled "Tire Press and Loader".

With such loader, great precision and accuracy can be achieved in pick and place or automatic transfer of large unwieldly objects such as uncured tires. However, if mounted on the beam of a tire press, the accuracy of the loader is then limited or controlled by the final positional accuracy of the beam on which it is mounted.

It is of course an advantage to mount the loader on the beam in slideback presses. It is also an advantage to utilize a high accuracy loader. The present invention enables the advantages of both to be achieved.

SUMMARY OF THE INVENTION

The present invention comprises a slideback tire press in combination with a precision loader mounted on the press head which enables the advantages of both to be utilized. With such invention a tire press of the slideback type has mounted on the press head beam a precision loader for the uncured tires. The beam moves vertically and then laterally or horizontally while maintaining the top mold section in parallelism with the bottom mold section for concurrent opening, loading of the uncured tire and discharge of the cured tire from the press. The invention includes a pair of tire chucks mounted on a loader beam for precise vertical movement through an electric motor driven rack and pinion drive. The loader beam is in turn mounted on the press head beam but through a lost motion connection. In this manner the loader is uncoupled from the press head during the final loading horizontal travel thereof to allow independent movement of the loader and press head. The loader is biased toward the press head by springs. When the press opens the loader moves with the press head but is stopped short of the full open position of the press head and is engaged by external alignment blocks which then move the loader relative to the press head against the spring pressure during the final portion of movement of the press head to locate the loader precisely in both an X and Y horizontal direction independently of any inconsistent full "open" position of the press or press beam.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In the annexed drawings:

FIG. 3 is a fragmentary enlarged horizontal front elevation of the mounting of the loader beam on the press;

FIG. 4 is a partial vertical section taken from the line 4—4 of FIG. 3; and

FIG. 5 is a schematic of the loader beam showing other forms of alignment guides for both horizontal and vertical final positions.

DETAILED DESCRIPTION OF THE PREFERRED EMBODIMENTS

Figure 1:
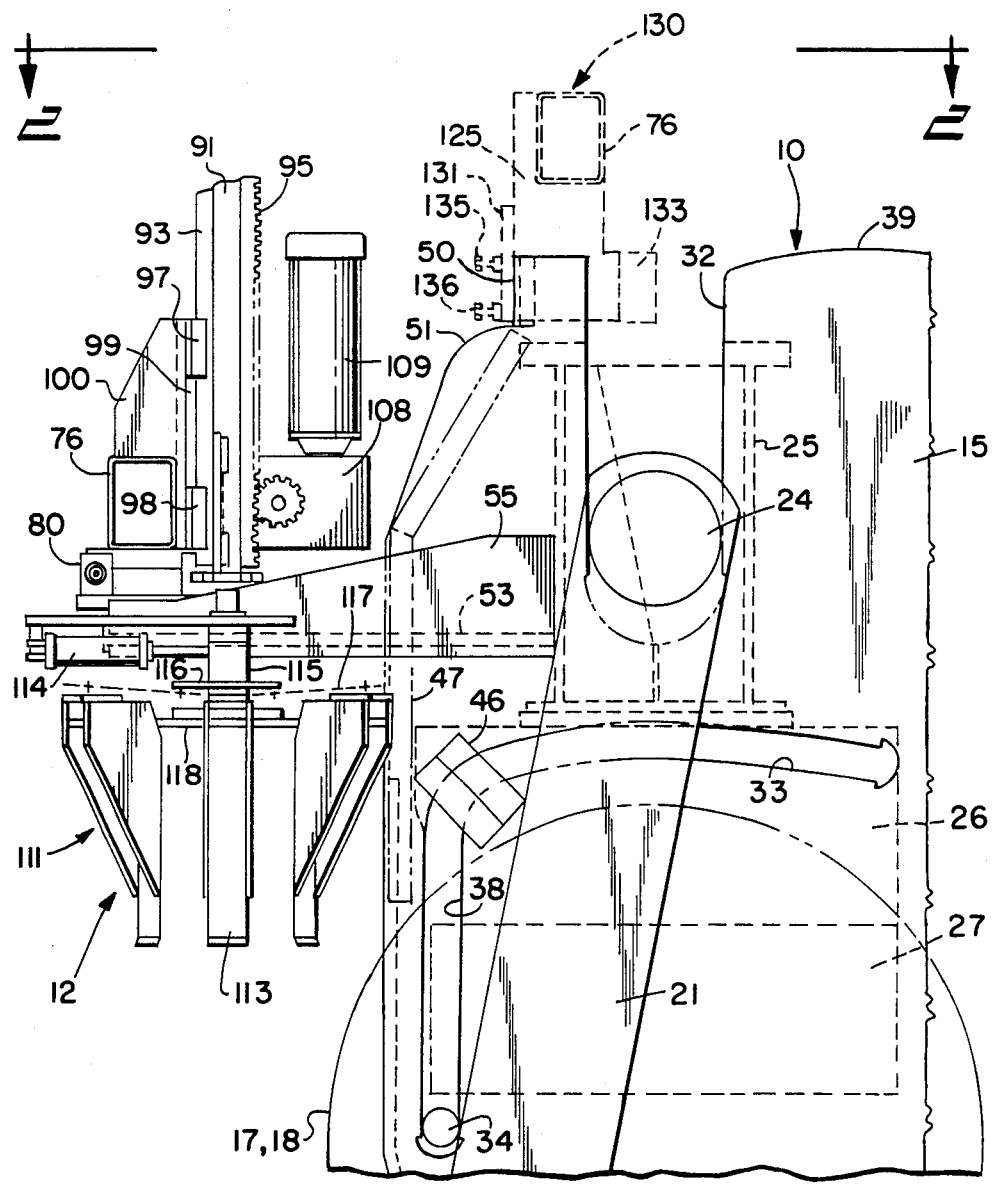
FIG. 1 is a fragmentary side elevation of a press and loader in accordance with the presence invention with the near end of the loader broken away.
Figure 2:
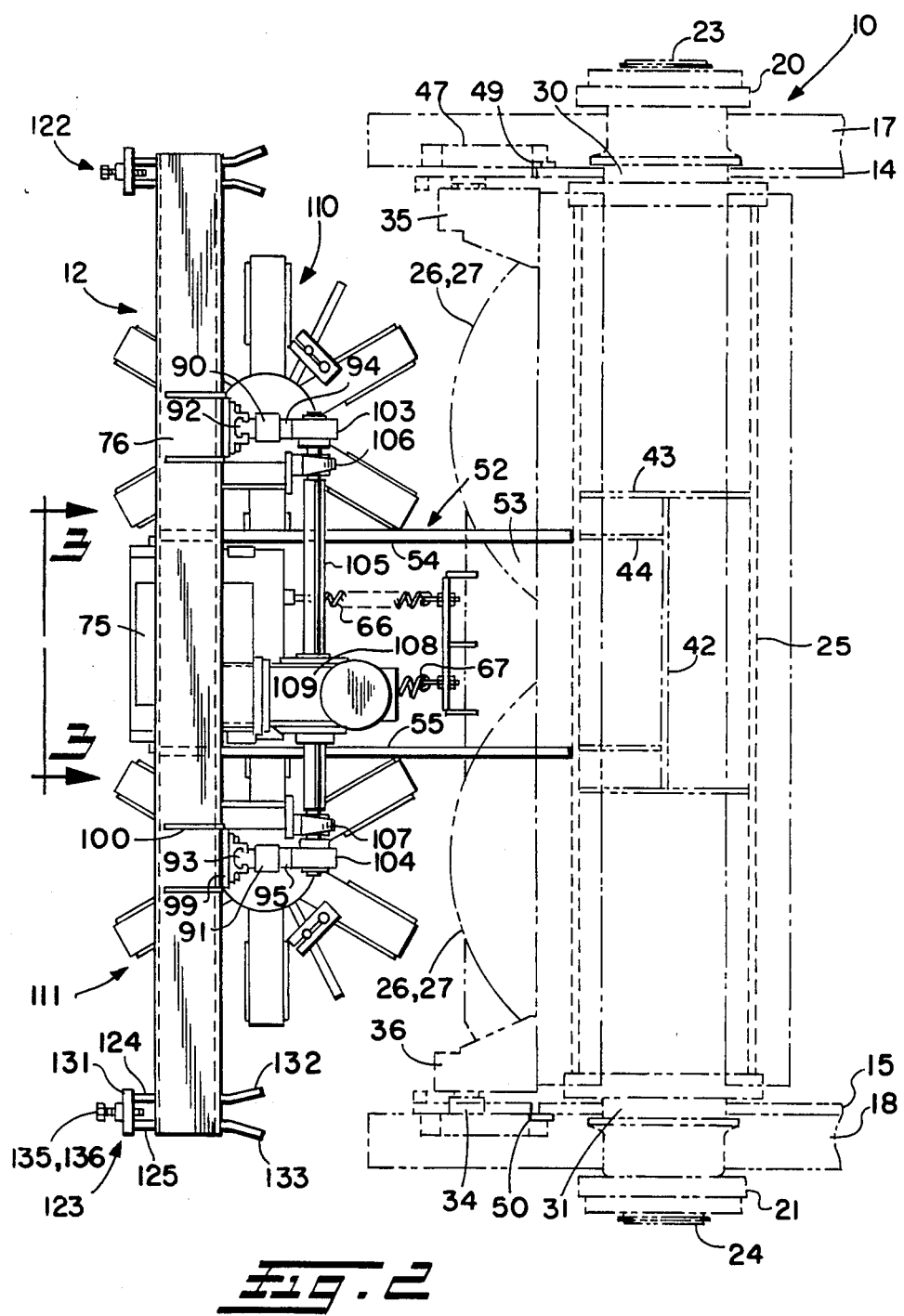
FIG. 2 is a fragmentary top plan view of such press and loader.

Referring first to FIGS. 1 and 2 the tire press of the present invention is indicated generally at 10 while the loader for the tire press is indicated generally at 12. The tire press which is of the slideback type includes side plates 14 and 15 with bull gears 17 and 18 journaled on the exterior thereof. Side links 20 and 21 are pivoted both to the bull gears and to the trunnions indicated at 23 and 24 which support the press head or beam 25. Upper and lower mold sections of the dual cavity press are indicated respectively at 26 and 27. It will be appreciated that the beam 25 pendently supports the upper mold sections while the lower mold sections are fixedly mounted on the base.

The trunnion supports 23 and 24 include rollers seen at 30 and 31 which ride in vertical slots 32 in the side plates. The side plates are each also provided with cam slots 33 in which cam rollers 34 ride, such rollers being rigidly supported on brackets 35 and 36 secured to the press beam 25. In this manner as the press opens, the bull gears will rotate in clockwise direction as seen in FIG. 1 causing the rollers 30 and 31 to move vertically in the slot 32. The rollers 34 move through the vertical portion 38 of the slot 33 maintaining the parallelism of the upper and lower mold sections during the vertical separation.

Continued rotation of the bull gears causes the rollers 30 and 31 then to roll rearwardly on the top edges 39 of the side plates while the roller 34 moves through the generally horizontal portion of the slot 33 still maintaining the parallelism of the mold sections as the upper mold section moves rearwardly to clear the lower mold section for overhead loading. It will be appreciated that the side plates seen in FIG. 1 are broken away and extend further to the rear than illustrated. The upper mold section in the opening of the press may carry with it the cured tire for discharge to the righthand side or the rear of the press as seen in FIG. 1. The slideback tire press above described is generally conventional and may be seen in greater detail in one or more of the aforenoted U.S. patents.

In order to function with the precision loader of the present invention some modifications to the press have been made. For example, the center of the beam 25 has been reinforced as indicated by the plates 42, 43 and 44 better to support the loader 12 which extends in cantilever fashion from the center of the beam. Also, the side plates have been reinforced by stiffeners indicated at 46 and 47, the latter extending along the front edge of the side plates. More importantly, the top of each side plate has been provided with vertically extending guide blocks or surfaces shown at 49 and 50. The upper front edge of the side plates has been rounded or relieved as indicated at 51 to provide horizontal front clearance for such guide blocks. Such guide blocks are precisely vertical, parallel, and of course in a vertical plane parallel to the vertical plane through the axes of the lower mold sections.

The loader 12 is supported in front of the press on an arm 52 extending from the beam 25, such arm comprising a horizontal plate 53 and side plates 54 and 55, the profile configuration of which is seen more clearly in FIG. 1.

Referring now more particularly to FIGS. 3 and 4, it will be seen that the side plates are interconnected at their outer ends by a somewhat smaller plate 57 and at such outer or distal end the plate 53 supports two parallel rod rails seen at 58 and 59 which extend normal to the aforenoted vertical plane through the centers of the bottom mold sections. Mounted on such rails are spaced preloaded ball bushings indicated at 60 and 61, two on each rail, supporting sub-carriage plate 63. The intermediate plate 63 is provided with anchors indicated at 65 for springs 66 and 67 which are adjustably anchored at their opposite ends to eye bolts 68 adjustably mounted in plate 69 which is secured to the arm plate 53. The springs bias the intermediate plate or sub-carriage 63 to the right as seen in FIG. 4 or again toward the vertical plane through the bottom mold section centers.

The plate 63 in turn supports preloaded ball bushings seen at 70 and 71 in which are journaled parallel rod rails 72 and 73, again there being two ball bushings for each rail. The rod rails 72 and 73 are mounted on the underside of base support 75 for loader beam 76. The rails 72 and 73 extend normal to the rails 58 and 59, or parallel to a vertical plane through the centers of the bottom mold sections.

As indicated in FIG. 3, the intermediate or sub-carriage plate 63 is provided with ears indicated at 79 and 80 while the beam base 75 is provided with aligned projections seen at 81 and 82 with springs 83 and 84 positioned therebetween. Such springs are under slight compression and maintain the beam in a longitudinally centered or neutral condition yet still free to move slightly in either longitudinal direction. The connection seen in FIGS. 3 and 4 comprises a biaxial lost motion connection which permits the beam 76 to move in the X or Y axis with respect to the arm 52 and thus the beam 25 supporting the top mold sections.

The rectangular tubular loading beam 76 supports for vertical movement two vertically extending posts seen at 90 and 91. Such posts are generally square in horizontal section and on the outer side include rod rails 92 and 93 and on the inner side racks 94 and 95. The rails 92 and 93 are each journaled in vertically spaced preloaded ball bushings seen at 97 and 98 mounted on plates 99 in turn supported by bracket plates 100 from the beam 76.

The racks 94 and 95 are driven from pinions 103 and 104, respectively, such pinions being driven by shaft 105 journaled in pillow blocks 106 and 107. The shaft 105 is driven by non-back driving worm transmission 108 from motor-brake unit 109. The shaft 105 and the pinions associated racks constitute a rack and pinion squaring mechanism which will drive the posts 90 and 91 vertically concurrently. Reference may be had to applicant's aforenoted copending application for a more detailed disclosure of a similar loader drive mechanism. Each of the pillow blocks and the transmission motor-brake unit may be mounted on the interior of the beam 76 as indicated more clearly in FIG. 2.

On the lower end of each post there is provided a tire engaging chuck indicated generally at 110 and 111, each of which comprises a series of radially movable tire engaging segments 113 which are opened and closed by piston cylinder assemblies indicated at 114. Such piston cylinder assemblies rotate collar 115 which includes a plate 116 which is connected to each shoe by a respective link 117 through universal joints radially to move the shoes on radially extending arms 118. For more detail of the type of chuck which may be employed with the present invention, reference may be had to U.S. Pat. No. 4,279,438 to applicant. It will also be appreciated that other types of loader chucks may be used with the present invention.

Referring now to FIGS. 1 and 2 it will be seen that the ends of the loader beam 76 are provided with guide brackets shown generally at 122 and 123. Since both are identical, only one will be described in detail. Each bracket comprises a vertically extending pair of guide plates indicated at 124 and 125, the profile configuration of which is seen in the phantom line position of the beam 76 seen in FIG. 1 at 130. Such plates are generally L-shape and are interconnected on their outer ends by a plate 131. Their inner ends which are below and interiorly of the beam are slightly uniformly flared away from each other as indicated at 132 and 133. On the vertically extending plates 131 bridging the inner end of the plates 124 and 125 there are provided two adjustment bolts seen at 135 and 136. These bolts which may be locked in place engage the vertically extending stop blocks 50 on each side plate of the press.

It can now be seen that the motor-brake unit 109 moves the side-by-side chucks vertically with respect to the loader. The loader also moves vertically with the beam 25 of the press and also moves horizontally with such beam. In the closed position of the press, the chucks move downwardly to engage, grip and elevate an uncured tire. Then, when the press opens, the entire loader assembly moves upwardly and rearwardly or to the right as seen in FIG. 1 until the adjustment bolts 135 and 136 contact the guide blocks 50. The flared leading edges of the plates 124 and 125 may move the entire loader somewhat longitudinally of the beam and as the press moves to its full open position, the adjustment bolts contact the guide blocks 50 holding the loader in its proper alignment position even though the press beam may continue movement to its full open position. In this manner the loader is uncoupled from the beam and permitted limited horizontal floating movement in both the X and Y horizontal axis relative to the beam. The loader is held against the alignment blocks 50 by the springs 66 and 67. When the press is fully opened the motor-brake unit 109 then drives the chucks downwardly holding the uncured tires to position them in precise axial alignment with the bottom mold sections for subsequent engagement by the shaping or curing bladder.

The loader is thus shifted against the spring force during the last portion of travel of the press beam and consequently the position of the loader is precisely located by the position of the stop blocks 50 and is independent of any inconsistent beam open position.

With reference to FIG. 5 it will be appreciated that other forms of alignment guides for the beam 76 may be provided as well as stops. In the embodiment of FIG. 5 there is illustrated the loader beam 76 provided with alignment pins extending both horizontally and vertically as indicated at 150 and 151, respectively. Such alignment pins may engage respective alignment bushings seen at 152 and 153, respectively, such alignment bushings being held by respective brackets 154 and 155. Each alignment pin may be provided with an adjustable stop collar seen at 156 and 157. In this manner the loader may be uncoupled and externally guided in either the down position, whether for pick-up or final loading, and in the final horizontal position.

In any event there is provided a precision loader mounted on a press beam and obtaining all of the advantages thereof in a slideback press.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the following claims.

What is claimed is:

1. A tire curing press comprising a top and bottom mold section, said top mold section being mounted for movement vertically away from and then laterally of said bottom mold section to unload the cured tire and clear the bottom mold section for overhead loading of an uncured tire, a loader mounted on said top mold section for movement therewith, means supporting said loader for horizontal movement with respect to said top mold section, and interengaging stop means operative to move said loader horizontally with respect to said top mold section to position said loader in alignment with said bottom mold section when the press is fully open.

2. A tire curing press as set forth in claim 1 wherein the movement of said means supporting said loader for limited movement is in a horizontal direction which is the same as the lateral movement of the top mold section.

3. A tire curing press as set forth in claim 1 wherein said tire curing press is a dual cavity press having top and bottom mold sections side-by-side, and wherein the movement of said means supporting said loader for limited movement is in a horizontal direction normal to a vertical plane through the centers of the bottom mold sections.

4. A tire curing press as set forth in claim 3 including spring means biasing said loader toward the top mold section in the horizontal direction.

5. A tire curing press as set forth in claim 4 wherein said stop means comprises two stops on said press operative to engage said loader, said stops being in a plane parallel to the vertical plane through the centers of the bottom mold sections.

6. A tire curing press as set forth in claim 5 wherein said loader includes an elongated horizontal beam, said beam engaging said stops at each end of said beam.

7. A tire curing press as set forth in claim 6 wherein said beam includes adjustable abutments for engaging said stops.

8. A tire curing press as set forth in claim 7 wherein said stops on said press comprise vertically extending alignment blocks at the sides of said press, said beam including side guides to capture said alignment blocks as said loader moves laterally with said top mold section.

9. A tire curing press as set forth in claim 8 including means supporting said beam on said press held for limited longitudinal movement.

10. A tire curing press as set forth in claim 6 including a pair of posts mounted on said beam for vertical movement, tire gripping chucks on the bottom of said posts, and motor drive means for raising and lowering said posts.

11. A tire curing press as set forth in claim 10 wherein each post includes a rack, and a respective pinion driven by said motor drive unit.

12. A tire curing press as set forth in claim 11 wherein each post includes a rod rail, said rod rails being journaled in ball bushings mounted on said beam.

13. A tire curing press as set forth in claim 2 wherein the movement of said means supporting said loader for limited movement is both in the horizontal direction which is the same as the lateral movement of the top mold section and also normal to the movement.

14. A tire curing press as set forth in claim 3 wherein the movement of said means supporting said loader for limited movement is also in a horizontal direction parallel to the vertical plane through the centers of the bottom mold sections.

15. A tire curing press as set forth in claim 14 including spring means biasing said loader toward the plane, and second spring means bias balancing said loader in either direction parallel to the plane.

16. A tire curing press as set forth in claim 15 wherein said stop means comprises two stops on said press operative to engage said loader, said stops being in a plane parallel to the vertical plane through the centers of the bottom mold sections.

17. A tire curing press as set forth in claim 16 wherein said loader includes an elongated horizontal beam, said beam engaging said stops at the ends of said beam.

18. A tire curing press as set forth in claim 17 wherein said beam includes adjustable abutments for engaging said stops.

19. A tire curing press as set forth in claim 18 wherein said stops on said press comprise vertically extending alignment blocks at the sides of said press, said beam including side guides to capture said alignment blocks as said loader moves laterally with said top mold section, said side guides moving said beam slightly parallel to the plane.

20. A tire curing press comprising top and bottom mold sections, means mounting said top mold section for vertical movement for opening and closing the press and for lateral movement to clear the bottom mold section for loading, a loader for said press, said loader including a tire chuck, a frame supporting said chuck, means to move said frame vertically in front of the press and horizontally to pick up a green tire and position it above the bottom mold section when the press is open, and lost motion connection means between said frame and said means to move said frame vertically and horizontally.

21. A tire curing press as set forth in claim 20 including interengaging stop means operative to position the chuck and the green tire supported thereby in precise alignment with the bottom mold section for loading.

22. A tire curing press as set forth in claim 21 wherein said stop means moves said loader frame through said lost motion connection means to align said chuck with the bottom mold section.

23. A tire curing press as set forth in claim 22 wherein said lost motion connection means enables said loader to move in an X-Y horizontal direction with respect to said press.

24. A tire curing press as set forth in claim 23 wherein one of the X-Y directions is parallel to the lateral movement and the other is normal thereto.

25. A tire curing press as set forth in claim 24 including spring means biasing said loader in each direction of movement.

26. A tire curing press as set forth in claim 20 wherein said frame comprises a beam extending normal to the lateral movement, and means supporting said beam on said means to move said frame for limited longitudinal and lateral movement.

27. A tire curing press as set forth in claim 26 including a pair of posts mounted on said beam for vertical movement, tire gripping chucks on the bottom of said posts, and motor drive means for raising and lowering said posts.

28. A tire curing press as set forth in claim 27 wherein each post includes a rack, and a respective pinion driven by said motor drive unit.

29. A tire curing press as set forth in claim 28 wherein each post includes a rod rail, said rod rails being journaled in ball bushings mounted on said beam.

30. A tire curing press as set forth in claim 26 wherein such limited lateral movement is in the same direction as the lateral movement of the top mold section, and the limited longitudinal movement is normal thereto.

31. A tire curing press of the slideback type having top and bottom mold sections with the top mold section being supported from a beam mounted for movement between side plates vertically and laterally to open the press, a loader including a tire chuck mounted on said beam for movement therewith, said tire chuck being supported on said loader for limited horizontal movement with respect to said beam, and alignment stops operative to shift said chuck in the pick-up or load position.

32. A tire press as set forth in claim 31 wherein said tire chuck is supported by limited horizontal movement toward and away from the beam.

33. A tire press as set forth in claim 32 wherein said tire chuck is supported by limited horizontal movement parallel to the beam.

34. A tire press as set forth in claim 31 wherein said loader includes a frame supporting said chuck which spans the side plates of the press, said alignment stops being at the ends of said frame and on said side plates.

35. A tire press as set forth in claim 34 wherein said press is a dual cavity press including side-by-side mold sections and said loader includes tire chucks, said alignment stops on said side plates being in a vertical plane parallel to a vertical plane through the centers of the lower mold sections.

36. A tire press as set forth in claim 35 wherein said loader frame and thus said tire chucks are supported for limited horizontal movement normal to the plane through the centers of the lower mold sections.

37. A tire press as set forth in claim 36 wherein said loader frame is spring biased toward the plane for the limited movement.

38. A tire press as set forth in claim 36 wherein said loader frame and thus said tire chucks are supported for limited horizontal movement parallel to the plane through the centers of the lower mold sections.

39. A tire press as set forth in claim 38 wherein said loader frame is spring biased for the movement parallel to the plane in opposite directions from a neutral position.

40. A tire press as set forth in claim 34 including a post mounted on said frame for vertical movement, said chuck being mounted on the bottom of said post.

41. A tire press as set forth in claim 40 including a rack on said post, a pinion driving said rack, and a motor-brake unit driving said pinion.

42. A tire press as set forth in claim 41 including a rod rail on said post, and ball bushings on said frame supporting said post for vertical movement.

* * * * *